United States Patent
Yamakoshi et al.

(10) Patent No.: US 8,324,299 B2
(45) Date of Patent: Dec. 4, 2012

(54) MOISTURE-CURABLE HOT MELT ADHESIVE

(75) Inventors: Hideyuki Yamakoshi, Osaka (JP); Tsuyoshi Tamogami, Osaka (JP)

(73) Assignee: Henkel Corporation, Rocky Hill, CT (US)

( * ) Notice: Subject to any disclaimer, the term of this patent is extended or adjusted under 35 U.S.C. 154(b) by 0 days.

(21) Appl. No.: 13/116,573

(22) Filed: May 26, 2011

(65) Prior Publication Data

US 2011/0275767 A1    Nov. 10, 2011

Related U.S. Application Data

(63) Continuation of application No. PCT/JP2009/069534, filed on Nov. 18, 2009.

(30) Foreign Application Priority Data

Nov. 27, 2008 (JP) ................................ 2008-302038

(51) Int. Cl.
*C09D 11/02* (2006.01)
(52) U.S. Cl. ...................................... 524/270; 524/457
(58) Field of Classification Search .................... 524/270
See application file for complete search history.

(56) References Cited

U.S. PATENT DOCUMENTS

| | | | | |
|---|---|---|---|---|
| 5,518,571 A | * | 5/1996 | Puerkner et al. | 156/332 |
| 6,280,561 B1 | * | 8/2001 | McInnis et al. | 156/305 |
| 6,660,376 B1 | * | 12/2003 | Zimmel et al. | 428/355 N |

FOREIGN PATENT DOCUMENTS

| | | |
|---|---|---|
| JP | 5-214312 | 8/1993 |
| JP | 7-179559 | 7/1995 |
| JP | 3317698 | 8/2002 |
| JP | 2003-515637 | 5/2003 |
| JP | 07-51282 | 3/2007 |
| WO | WO01/40343 | 7/2001 |

OTHER PUBLICATIONS

International Search Report in connection with International Patent Application No. PCT/JP2009/069534 mailed Feb. 16, 2010.

* cited by examiner

*Primary Examiner* — Doris Lee
(74) *Attorney, Agent, or Firm* — James E. Piotrowski

(57) ABSTRACT

A moisture-curable hot-melt adhesive having an excellent balance of environmental friendliness, compatibility of ingredients, early-stage adhesive strength, heat resistance after moisture curing, tack free time, etc. and a method of manufacture for this hot-melt adhesive. A moisture-curable hot-melt adhesive which contains a urethane polymer that has a terminal isocyanate group and a moisture-curable hot-melt adhesive that contains urethane modified resin, has a residual percentage of isocyanate compound of 5 wt. % or less, and has a heat-resistant softening temperature after moisture curing of 60° C. or higher, has an excellent balance of the aforementioned. Urethane modified resin can be obtained by reacting a resin derivative that has a hydroxyl group with an isocyanate compound, and a moisture-curable hot-melt adhesive can be produced by mixing urethane-modified resin, polymer, and isocyanate compound. The adhesive is particularly useful for building materials, electronics materials, the automotive field, and the like.

10 Claims, No Drawings

MOISTURE-CURABLE HOT MELT ADHESIVE

CROSS-REFERENCE TO RELATED APPLICATIONS

This application is a continuation of International Application No. PCT/JP2009/069534, filed 18 Nov. 2009 and published 3 Jun. 2010 as WO 2010/061759, which claims priority from Japanese Application No. 2008-302038, filed 27 Nov. 2008, each of which is incorporated herein by reference in its entirety.

The present invention pertains to a moisture-curable hot-melt adhesive that has excellent heat resistance, short tack free time, and excellent initial adhesion strength and a method of manufacture thereof.

BACKGROUND

Moisture-curable hot-melt adhesives are used in various fields such as the interior construction materials field (or building materials field) and electronic materials field. Moisture-curable hot-melt adhesives are adhesives that contain a urethane prepolymer having a terminal isocyanate group, and generally they are adhesives where a coating is applied to all the adherents (or to substrate and adherent), and after initial adhesion through cold hardening, the adhesive strength, heat resistance, and other properties are improved by moisture curing in which the urethane prepolymer increases in molecular weight as a result of isocyanate groups cross-linking with moisture in the atmosphere.

Initial adhesive strength is one of the properties needed in a moisture-curable hot-melt adhesive. Steps are taken so as to increase initial adhesive strength, such as increasing the initial wettability to the substrate by blending tackifier resin or improving the initial cohesion by blending thermoplastic resin into the moisture-curable hot-melt adhesive.

However, tackifier resins and thermoplastic resins are not necessarily sufficiently compatible with urethane, the principle ingredient of moisture-curable hot-melt adhesives.

Patent Documents 1 and 2 disclose the blending of a tackifier resin having a hydroxyl group (referred to below as "hydroxyl-containing tackifier resin") in order to improve compatibility of adhesive ingredients. Patent Document 1 discloses reacting a resin derivative having a hydroxyl group, polyol, and an isocyanate compound simultaneously and the manufacture of moisture-curable hot-melt adhesive consisting of a urethane prepolymer. Patent Document 2 discloses a urethane hot melt adhesive in which a reactive tackifier resin having a hydroxyl value is blended in, and it discloses simultaneously reacting a reactive tackifier resin, polyol, isocyanate compound, and a thermoplastic polymer such as an ethylene vinyl compound.

The hydroxyl-containing tackifier resins disclosed in Patent Documents 1 and 2 were able to improve compatibility with adhesive ingredients, but there were cases in which they degraded the special characteristics that moisture-curable hot-melt adhesive have, such as initial adhesive strength and heat resistance after moisture curing. This being the case, adding excess isocyanate compound was thought to improve heat resistance of moisture-curable hot-melt adhesive after moisture curing, but isocyanate compounds, which are volatile in adhesives, persist to a great degree and are environmentally undesirable.

In addition, when a hydroxyl-containing tackifier resin is blended in, the tack free time of a moisture-curable hot-melt adhesive is lengthened, and solidification properties can be degraded. More specifically, if a laminated product is manufactured by bonding an adherent to a wood, plastic, or other substrate using a moisture-curable hot-melt adhesive where the tack free time has lengthened, time is required for curing the laminate. Consequently, when cutting the resultant laminated product, if the time after bonding together substrate and adherent to the cutting of the resultant laminated object is shortened, burrs maybe be produced in the cross section of the laminated object at the time of cutting, and the adherent may come unstuck from the substrate. Consequently, in order to increase production efficiency for laminated products, it is necessary to shorten the tack free time of the moisture-curable hot-melt adhesive, increase the initial adhesive strength, and shorten the time after bonding together substrate and adherent to the cutting of the laminated object.

Thus, in recent years, a moisture-curable hot-melt adhesive has been wanted that has an excellent balance of environmental friendliness, compatibility of ingredients (homogeneity of adhesive or adhesive that does give rise to phase separation), initial adhesive strength, tack free time, heat resistance after moisture curing, and other such factors, and the development of such has become an urgent need.

Patent Document 1 is Japanese Patent No. 3317698. Patent Document 2 is Published Japanese Translation 2003-515637 of PCT International Publication No. WO01/40343.

The present invention was developed to solve such a problem, the problem being to provide a moisture-curable hot-melt adhesive that has excellent environmental friendliness, compatibility of ingredients, initial adhesive strength, heat resistance after moisture curing and a short tack free time and to provide a method of manufacture of such a moisture-curable hot-melt adhesive.

As a result of diligent research, the inventors surprisingly discovered that when a specific tackifier resin is used, a moisture-curable hot-melt adhesive is obtained having high initial adhesive strength, excellent heat resistance after moisture curing, and short tack free time without adding an excess of isocyanate compound, and brought the present invention to completion.

More specifically, as one point, the present invention is a moisture-curable hot-melt adhesive that contains a urethane prepolymer having a terminal isocyanate group, and provides a moisture-curable hot-melt adhesive which contains urethane modified resin, and a residual percentage of isocyanate compound of 5.0 wt-% or less.

In one mode, the present invention provides a moisture-curable hot-melt adhesive obtained by the reaction of a resin derivative having a hydroxyl group with isocyanate compound. In another mode, the present invention provides a moisture-curable hot-melt adhesive obtained by blending (A) urethane modified resin, polyol, and isocyanate compound.

In the preferred mode, the present invention provides a moisture-curable hot melt adhesive obtained by the reaction of isocyanate compound with polyol. In another preferred mode, the present invention provides a moisture-curable hot melt adhesive additionally comprising thermoplastic resin.

As another point, the present invention provides a method of manufacture for a moisture-curable hot-melt adhesive having (i) a process to obtain (A) urethane modified resin by the reaction of a resin derivative having hydroxyl group with isocyanate compound, and (ii) a process to blend (A) urethane modified resin, polyol, and isocyanate compound.

In another mode, the present invention is a method of manufacture for a moisture-curable hot-melt adhesive that includes a process for obtaining urethane prepolymer by blending polyol and isocyanate compound in process (ii), and provides a method of manufacture for moisture-curable hot-melt adhesive in which the residual percentage of isocyanate compound is 5.0 wt-% or less, and the heat resistant softening temperature is 60° C. or higher.

The present invention on the preferred points provides the aforementioned moisture-curable hot-melt adhesive manufactured by the aforementioned method of manufacture.

In this specification, "tack free time" refers to the time required from when melted moisture-curable hot-melt adhesive is applied until the tackiness is lost.

"Initial adhesive strength" refers to the adhesive strength after moisture-curable hot-melt adhesive has been melted and applied to an adherent when the temperature of the adhesive has decreased and the adhesive has hardened and become solid. The initial adhesive strength is affected by the wettability and cohesion.

"Wettability" can be measured by the magnitude of the angle ($\alpha$) formed by the edge where melted adhesive contacts the substrate when heated and melted moisture-curable hot-melt adhesive is placed in contact with a substrate (solid). The smaller the angle $\alpha$, the greater wettability is and the easier adhesion is.

"Cohesion" refers to the force that arises in the course of cooling that stems from the interaction at work between molecules within the adhesive after applying a coating of heated and melted moisture-curable hot-melt adhesive using an applicator.

"Maximum adhesive strength" refers to the adhesive strength after moisture-curable hot-melt adhesive solidifies and after it cures through the reaction of isocyanate groups in the adhesive with moisture in the atmosphere, that is, after moisture curing.

In the present invention, "urethane modified resin" refers to a modified resin obtained by a reacting resin derivative having a hydroxyl group with an isocyanate compound. "Resin derivative having a hydroxyl group" refers to a derivative that has undergone a reaction so that the resin has a hydroxyl group. For example, a resin derivative having a hydroxyl group can be obtained by bonding a resin carbonyl group and a hydroxyl group by means of an ester bond through the reaction of resin and diol.

"Urethane modified resin" is obtained by reacting an isocyanate compound with the hydroxyl group that the resin derivative has. The hydroxyl group forms a urethane bond by reacting with an isocyanate group. Accordingly, the urethane modified resin substantially has no hydroxyl groups, and as a result, has substantially no reactivity with isocyanate compound.

Consequently, when producing moisture-curable hot-melt adhesive, the inventors thought it unnecessary to add an excess of isocyanate compound because there is substantially no effect on the reactivity of the polyol and isocyanate compound even if urethane modified resin is added to a mixture of a compound of polyol and isocyanate that forms the prepolymer. As a result, the inventors found that a moisture-curable hot-melt adhesive containing the aforementioned "urethane modified resin" of the present invention could achieve a moisture-curable hot-melt adhesive having excellent heat resistance after moisture curing and a shortened tack free time, and they completed the present invention.

The moisture-curable hot-melt adhesive of the present invention is a moisture-curable hot-melt adhesive containing a urethane prepolymer that has a terminal isocyanate group, and because it contains urethane modified resin, has a residual percentage of isocyanate compound of 5.0 wt-% or less, and has a heat resistant softening point after moisture cooling of 60° C. or lower, it has an excellent balance of environmental friendliness, compatibility, initial adhesive strength, tack free time, heat resistance after moisture curing, and other such properties.

Because it is not necessary to produce the moisture-curable hot-melt adhesive of the present invention by adding excess isocyanate compound, the present invention has excellent environmental friendliness and excellent compatibility with each ingredient. Heat resistance after moisture curing is excellent; and because initial wettability and cohesion are high, initial adhesive strength is excellent, and tack free time is short.

When producing a laminated product by bonding together a substrate (wood-based material or plastic) with an adherent (film, decorative sheet, plastic) with the moisture-curable hot-melt adhesive of the present invention, the amount of time after bonding the substrate and adherent until performing the cutting process on the laminated product is somewhat shortened, the adherent does not peel off, and burrs are not produced on machined surfaces.

Consequently, when considering the production efficiency for laminated products, the moisture-curable hot-melt adhesive of the present invention is extremely effective.

Because urethane modified resin of the moisture-curable hot-melt adhesive of the present invention is obtained by the reaction of a resin derivative having a hydroxyl group with an isocyanate compound, the isocyanate compound reacts directly with polyol. Because urethane modified resin and isocyanate compound substantially do not react, a moisture-curable hot-melt adhesive is obtained having excellent heat resistance and a short tack free time without blending in excess isocyanate compound.

Because the aforementioned urethane prepolymer in the present invention is obtained by the reaction of polyol and an isocyanate compound, urethane-modified resin substantially does not participate in the reaction. Accordingly, because it is not necessary to use excess isocyanate compound to improve the heat resistance after moisture curing, the residual percentage of isocyanate compound is low, and this is environmentally desirable.

Because the moisture-curable hot-melt adhesive of the present invention is additionally comprised of thermoplastic resin, the tack free time is further shortened, the residual percentage of isocyanate compound is low, heat resistance after moisture curing is superior, and compatibility is superior.

Because the method of manufacture of the moisture-curable hot-melt adhesive of the present invention is a method of manufacture having (i) a process to obtain urethane modified resin by the reaction of a resin derivative having a hydroxyl group with an isocyanate compound, and (ii) a process to blend urethane modified resin, polyol, and isocyanate compound, urethane modified resin does not participate in the reaction of polyol and isocyanate compound, and hence, heat resistance after curing of the moisture-curable hot-melt adhesive can be increased without adding excess isocyanate compound.

Additionally, because the residual percentage of isocyanate compound can be maintained at a low level, the method of manufacture of the present application also is more environmentally friendly. Further, because the moisture-curable hot-melt adhesive obtained has a short tack free tie and increased initial cohesion, the initial adhesive strength is also superior.

Because the method of manufacture of the moisture-curable hot-melt adhesive of the present invention is a method of manufacture for a moisture-curable hot-melt adhesive that includes a process to obtain urethane prepolymer by blending polyol and isocyanate compound in process (ii), the residual percentage of isocyanate in the moisture-curable hot-melt adhesive is 5.0 wt-% or less, and the heat resistant softening temperature after moisture curing is 60° C. or higher, a moisture-curable hot-melt adhesive having high heat resistance after moisture curing can be manufactured, despite the fact that the residual percentage of isocyanate compound is low within the moisture-curable hot-melt adhesive, because the isocyanate compound substantially does not react with the urethane modified resin.

The moisture-curable hot-melt adhesive of the present invention comprises a "urethane prepolymer having a terminal isocyanate group". "Urethane prepolymer having a terminal isocyanate group" in the present invention is not particularly restricted provided the intended moisture-curable hot-melt adhesive can be obtained. This sort of urethane prepolymer is obtained by reacting polyol and isocyanate compound in accordance with conventionally-known methods. In addition, "urethane prepolymer having a terminal isocyanate group" in this specification is also described simply by "urethane prepolymer."

"Polyol" in this specification is not particularly restricted if the intended urethane prepolymer can be obtained, and publicly known polyols used in ordinary polyurethane production can be used as the "polyol." Polyols having 1-3 functional groups are preferred, and the bifunctional polyol referred to as diol is particularly preferred. Polyol can be used by itself or in combination.

Polyols that may be used as this sort of "polyol" are classified, for example, as ethers, esters, polycarbonates, polydienes, and the like. Ether-type polyols can be illustrated, for example, by poloxytetramethylene polyol* (PTMG), polyoxypropylene polyol* (PPG), polyoxyethylene polyol* (PEG), and the like. Ester-type polyols can be illustrated, for example, by polyethylene adipate (PEA), polybutylene adipate (PBA), polyalkylene terephthalate, polyalkylene isophthalate, polyalkylene phthalate, polycaprolactone (PCL), and the like. In addition, copolymers of these can be used such as, for example, block copolymers of PTMG and caprolactone, copolymers of polyester polyol and polyether polyol, and the like. These polymers can be synthesized, for example, by methods that induce ring-opening copolymerization of s-caprolactone to PTMG, methods that induce ring-opening copolymerization of tetrahydrofuran, ethylene oxide, or propylene to polyester polyol, and other such methods. In addition, these can be illustrated by substituted and unsubstituted polyalkylene ether glycol, polyhydroxy diethers such as polyhydroxy polyalkylene ether, polyhydroxy polyester, polyol ethylene oxide adducts, and glycol monosubstituted ethers.

In addition, there are no particular restrictions on the aforementioned "isocyanate compound" if the intended urethane polymer can be obtained, and publicly known isocyanate compounds that are used in ordinary urethane production may be used as the "isocyanate compound." The number of isocyanate groups contained per molecule in the isocyanate compound is preferably an average of 1-3 groups, and the bifunctional isocyanate compound referred to as diisocyanate compound is particular preferred. Isocyanate compound can be used individually or in combination.

The aforementioned "isocyanate compound" can be illustrated, for example, by ethylene diisocyanate, ethylidene diisocyanate, propylene diisocyanate, butylene diisocyanate, hexamethylene diisocyanate, toluene diisocyanate, cyclopentylene-1,3-diisocyanate, cyclohexylene-1,4-diisocyanate, cyclohexylene-1,2-diisocyanate, 4,4'-diphenylmethane diisocyanate, 2,2'-diphenylpropane-4,4'-diisocyanate, p-phenylene diisocyanate, m-phenylene diisocyanate, xylylene diisocyanate, 1,4-naphthylene diisocyanate, 1,5-naphthylene diisocyanate, diphenyl-4,4'-diisocyanate, azobenzene-4,4'-diisocyanate, diphenyl sulfone-4,4'-diisocyanate, dichlorohexamethylene diisocyanate, furfurylidene diisocyanate, 1-chlorobenzene-2,4-diisocyanate, and the like. Isocyanate compound can be used individually or in combination.

When producing the "urethane prepolymer" of the present invention, as long as the intended urethane prepolymer is obtained, mono-ol or monoisocyanate can be used, and while trifunctional polyol and trifunctional isocyanate can be used, it is preferable to produce using bifunctional polyol (diol) and bifunctional isocyanate (diisocyanate). Producing "urethane prepolymer" by reacting bifunctional polyol and bifunctional isocyanate is more preferable from the points of thermal stability and control of the method of manufacture (and production processes thereof) of the moisture-curable hot-melt adhesive obtained. In addition, use of 2 moles of bifunctional isocyanate are used per 1 mole of bifunctional polyol is preferable because the intended urethane prepolymer can be produced comparatively easily.

"Urethane modified resin" in the present invention refers to modified resin that has within the molecule a urethane bond formed by the reaction of a hydroxyl group and isocyanate group, and it is obtained by the reaction of a resin derivative having a hydroxyl group with an isocyanate compound. Additionally, when producing urethane modified resin, a diol having a weight-average molecular weight of 1000 or less may be used.

Although described above, "resin derivative having a hydroxyl group" refers more specifically to a resin derivative having a residual hydroxyl group and is, for example, an ester of a resin and polyhydric alcohol, formalin modified resin, or modified resin alcohol, or the like. Hydroxyl values of 10-180 are preferred for the resin derivative having a hydroxyl group.

As to the "resin derivative having a hydroxyl group" of the present invention, various modifications are performed on the resin, and as a result, a hydroxyl group remains, and this can be illustrated most commonly by an ester of resin and polyhydric alcohol.

"Resin", in addition to unmodified resins such as gum resin, wood resin, and tall oil resin, can be illustrated by disproportionated resin, hydrogenated resin, polymerized resin, purified products thereof and the like that take these resins as a base. In addition, for these resin classes it is also possible to use fortified resin to which maleic acid, maleic anhydride, fumaric acid, acrylic acid and the like have been added or modified products thereof.

Polyhydric alcohol can be illustrated by dyhydric alcohols such as ethylene glycol, propylene glycol, diethylene glycol, dipropylene glycol, trihydric alcohols such as glycerin and trimethylolpropane, tetrahydric alcohols such as pentaerythritol and diglycerin, and hexahydric alcohols such as dipentaerythritol.

Esters of resin and polyhydric alcohol (referred to below as "resin ester") can be obtained using known methods. For example, an ester can be obtained by heating resin and alcohol under an inert atmosphere such as nitrogen gas. Reaction conditions at this time are generally 250-280° C. for 5-20 hours.

The aforementioned method of manufacture is applicable to formalin modified resin, modified resin alcohol, end the like and it is also applicable to resins that have been modified by phenolization or other such modification.

The "isocyanate compound" that is the raw material for urethane modified resin may be the same as or different than the "isocyanate compound" described when producing "urethane prepolymer". The "isocyanate compound" that is the raw material for urethane modified resin should have at least one isocyanate group within the compound, and both monoisocyanate and diisocyanate are acceptable. Isocyanate to which polyhydric alcohols and the like have been added are also acceptable.

The "residual percentage of isocyanate compound" is 5.0 wt-% or less; 3.0 wt-% or less is preferable, and 0.1-3.0 wt-% is particularly preferable. A residual percentage of isocyanate compound greater than 5.0 wt-% is undesirable for environmental health and can reduce initial adhesive strength. A "heat resistant softening temperature after moisture curing" for the moisture-curable hot-melt adhesive of 60° C. or higher is preferable and 70° C. or higher is particularly preferable.

Because the modified resin "urethane modified resin" obtained by reacting a resin derivative having a hydroxyl group with an isocyanate compound is used in the moisture-curable hot-melt adhesive of the present invention, urethane modified resin and urethane prepolymer can be controlled separately. Accordingly, as described below, the residual percentage of isocyanate compound can be controlled to 5.0 wt % or less and the heat resistant softening temperature after moisture cooling can be controlled to 60° C. or higher.

"Residual percentage of isocyanate compound" in this specification refers to the wt-% of unreacted isocyanate compound remaining in the moisture-curable hot-melt adhesive.

More specifically, the residual percentage of isocyanate compound is shown in Formula (I) below.

Residual percentage of isocyanate compound (wt %)=Amount unreacted isocyanate compound (gm)×100/Amount moisture-curable hot-melt adhesive (gm)   Formula (I)

The amount of unreacted isocyanate compound remaining in the moisture-curable hot-melt adhesive can be calculated by mixing methanol into moisture-curable hot-melt adhesive and determining the amount of reactant obtained by reacting the unreacted isocyanate compound in the adhesive with the methanol. More specifically, first determine the amount of the aforementioned reactant by mixing an excess of methanol with a predefined amount of moisture-curable hot-melt adhesive. Next calculate the weight of unreacted isocyanate compound from the value for the quantity of reactant. Then, calculate the residual percentage of isocyanate compound (wt-%) from the weight of moisture-curable hot-melt adhesive used and the weight of unreacted isocyanate compound.

An explanation summarizing the method of calculation actually used is as follows. First, isocyanate compound used for producing prepolymer for the moisture-curable hot-melt adhesive and methanol were reacted, and taking the obtained reactant as a sample resin, a working curve was created using gas permeation chromatography (GPC).

Next, methanol was actually reacted with the moisture-curable hot-melt adhesive of the present invention, the reaction resin obtained was measured by GPC, and the reactant peak was obtained. From this peak and the aforementioned working curve, the unreacted isocyanate compound could be determined.

Finally, the residual percentage of isocyanate compound was calculated from the measured weight of moisture-curable hot-melt adhesive (g) and the calculated amount of unreacted isocyanate compound (g).

"Heat resistant softening temperature after moisture cooling" refers to the temperature measured by the method specified in JIS K6833. A summary of the measurement method is described below.

First, bond together particle board and a sheet lightly treated with adhesive with moisture-curable hot-melt adhesive, and after approximately 120 minutes, cut into test pieces 25 mm×150 mm in size using a cutter. After curing for approximately 120 minutes under 20° C., 60% humidity conditions, hang a 500 g weight from the ears of the test piece, and raise the temperature within a heating bath. The temperature when the adhesive softens and the weight falls is called the heat resistant softening temperature. The heat resistant softening temperature is a temperature that indicates heat resistance, and higher temperatures are more preferred.

The moisture-curable hot-melt adhesive of the present invention may additionally comprise (B) thermoplastic resin.

If it does not interfere with the performance of the intended moisture-curable hot-melt adhesive, the "(B) thermoplastic resin" of the present invention may be generally referred to as thermoplastic resin, and there are no particular restrictions on it. Ordinarily, (B) thermoplastic resin is produced by polymerization of monomer. Monomers as raw materials thereof can be illustrated, for example, by (meta) methyl acrylate, (meta) ethyl acrylate, (meta) n-propyl acrylate, (meta) n-butyl acrylate, (meta) sec-butyl acrylate, (meta) t-butyl acrylate, (meta) n-octyl acrylate, 2-ethylhexyl acrylate, (meta) acrylic acid, maleic anhydride, itaconic acid, acetic acid, vinyl acetate, ethylene vinyl acetate, and the like. Monomer may be used individually or in combination.

In considering the balance of compatibility, initial adhesive strength, heat resistance after moisture curing and other properties of the moisture-curable hot-melt adhesive of the present invention, among these monomers, a combination of ethylene vinyl acetate is ideal in the present invention. Accordingly, ethylene vinyl acetate resin is most preferable in the present invention as (B) thermoplastic resin. A vinyl acetate content percentage of ethylene vinyl acetate resin of 10 wt-% or higher is preferred, and 20-40 wt-% is particularly preferred. Compatibility may worsen when the vinyl acetate percentage content is less than 10 wt-%.

The moisture-curable hot-melt adhesive of this invention may include other additives as necessary. An "additive" is a substance normally used in moisture-curable hot-melt adhesives, and if the substance can be used in the moisture-curable hot-melt adhesive of the present invention, there are no particular restrictions. This sort of additive can be illustrated, for example, by plasticizers, antioxidants, pigments, light stabilizers, flame retardants, catalysts, waxes, and the like.

"Plasticizers" can be illustrated, for example, by dioctyl phthalate, dibutyl phthalate, dioctyl adipate, mineral spirits, and the like.

"Antioxidants" can be illustrated, for example, by phenolic-based antioxidants, phosphite-based antioxidants, thioether-based antioxidants, amine-based antioxidants, and the like.

"Pigments" can be illustrated, for example, by titanium oxide, carbon black, and the like.

"Light stabilizers" can be illustrated, for example, by benzotriazole, hindered amine, benzoate, benzotriazole, and the like.

"Flame retardants" can be illustrated, for example, by halogen flame retardants, phosphorus flame retardants, antimony flame retardant, metal hydroxide flame retardants, and the like.

"Catalysts" can be illustrated by metal catalysts, for example, tin catalysts (such as trimethyltin laurate, trimethyltin hydroxide, dibutyltin dilaurate, and dibutyltin maleate), lead catalysts (such as lead oleate, lead naphthenate, and lead octenate), other metal catalysts (such as cobalt naphthenate and other metallic salt naphthenates), and amine catalysts, such as triethylenediamine, tetramethylethylene diamine, tetramethylhexylene diamine, diaza-bicycloalkenes, and dialkylaminoalkylamines, and the like.

"Waxes" can be illustrated, for example, by paraffin wax, microcrystalline wax, and other such waxes.

The method of manufacture for the moisture-curable hot-melt adhesive of the present invention has (i) a process to obtain (A) urethane modified resin by the reaction of isocyanate compound and resin derivative having a hydroxyl group, and (ii) a process to blend (A) urethane modified resin, polyol, and isocyanate compound.

The reaction of isocyanate compound and resin derivative having a hydroxyl group of process (i) can be carried out using the same reaction method as for isocyanate compound and a general compound having a hydroxyl group, and normally it can be carried out by blending the two.

The method for blending (A) urethane modified resin, polyol, and isocyanate compound of process (ii) can be carried out using known blending methods.

The "blending" of process (i) and "blending" of process (ii) can be carried out in the same manner.

By adopting the aforementioned method of manufacture with the present invention, the "residual percentage of isocyanate compound" in the moisture-curable hot-melt adhesive can be controlled to 5.0% wt-% or less, and a heat resistant softening temperature after moisture cooling" can be controlled to 60° C. or higher.

In the method of manufacture of the present invention, (A) urethane modified resin is produced by reacting isocyanate compound with hydroxyl-containing tackifier resin, and subsequently, because a method of manufacture is provided of a moisture-curable hot-melt adhesive to which polyol and isocyanate compound have been added, it is completely different from conventional methods of manufacture in which hydroxyl-containing tackifier resin, polyol, and isocyanate compound are reacted simultaneously (or en bloc). The hydroxyl-containing tackifier resin has a hydroxyl group that can react with isocyanate compound. This hydroxyl group reacts with the isocyanate compound or urethane prepolymer terminal isocyanate group and halts the progress of the chain extending reaction. By halting the chain extending reaction, the moisture-curable hot-melt adhesive becomes unable to achieve sufficient heat resistance after moisture cooling. If excess isocyanate compound is added to increase heat resistance, a large amount of isocyanate compound will remain within the moisture-curable hot-melt adhesive, and the residual percentage of isocyanate compound will attain values higher than 5.0 wt-%. If moisture-curable hot-melt adhesive in which a large amount of isocyanate compound remains is melted, a large quantity of isocyanate compound will volatize due to the heat, and the work environment is greatly impaired. In addition, hydroxyl-containing tackifier resin is incorporated within the urethane prepolymer, and the ability to crystallize of the urethane prepolymer is hindered, and as a result, the tack free time lengthens, and moisture-curable hot-melt adhesive is obtained where the initial onset of cohesion is delayed.

Thus, different from the "method of manufacture that reacts hydroxyl-containing tackifier resin, polyol, and isocyanate compound en bloc", a characteristic of the method of manufacture of the present invention is that it first reacts isocyanate compound with hydroxyl-containing tackifier resin and causes the elimination of hydroxyl groups of the hydroxyl-containing tackifier resin. Because polyol and isocyanate compound are blended with urethane-modified resin, the reaction of polyol and isocyanate compound is not substantially affected by the urethane-modified resin. More specifically, a characteristic of the method of manufacture of the present invention is that it independently controls each ingredient by carrying out separate production of urethane modified resin and prepolymer. Accordingly, a moisture-curable hot-melt adhesive can be provided without the use of excess isocyanate compound that has excellent heat resistance after moisture cooling, has a short tack free time, and has excellent initial adhesive strength.

The reason that good results are obtained by separately carrying out the production of urethane modified resin and prepolymer in this manner is still unclear at this point, but urethane modified resin does not participate in the prepolymer formation reaction, and it is thought that a synergistic effect is produced and that results were obtained as in the working examples and comparative examples described later by the prepolymer and urethane modified resin each functioning independently within the adhesive. However, the present invention is not limited in any way by this reason.

Accordingly, the present invention provides a moisture-curable hot-melt adhesive of the present invention as described above that is manufactured by the method of manufacture of the present invention as described above.

The moisture-curable hot-melt adhesive of the present invention can be used in fields that make use of conventional moisture-curable hot-melt adhesives. In addition, it can be used in exterior materials and interior materials, flooring, bonding decorative sheet to substrates, profile lapping, and the like for building materials that require high initial adhesive strength.

The aforementioned moisture-curable hot-melt adhesive is ideal when bonding veneering material to floors as an interior building material, but it is not limited to bonding to floors, and it can bond decorative sheet to other substrates as well. Accordingly, moisture-curable hot-melt adhesive of the present invention can also be used for carpentry, paper converting, textile processing, and for other general purposes.

The moisture-curable hot-melt adhesive in the present invention can be used with the same methods as conventional moisture-curable hot-melt adhesives, and as long as the intended part or laminated product can be obtained, there are no particular limitations imposed on it. In addition, when bonding an adherent to a substrate, for example, the moisture-curable hot-melt adhesive may be applied to the substrate, and it may be applied to the adherent. "Adherents" that are normally used are permissible and are not particularly restricted, and specifically, they can be illustrated by films and decorative sheets. Films may be colorless or colored, transparent or opaque, and include for example, polyolefin resin, polyester resin, acetate resin, polystyrene resin, and vinyl chloride resin. Polyolefin resin can be illustrated by polyethylene and polypropylene, and polyester resin can be illustrated, for example, by polyethylene terephthalate.

Decorative sheets can be illustrated by the following examples: plastic material sheet such as rigid or semi-rigid vinyl chloride resin, polyolefin resin, and polyester resin; wood veneer of wood processed into sheet form; and decorative paper printed with various decorations.

"Substrates" that are normally used are permissible and are not particularly restricted, and may be illustrated by the following examples: wood-based materials such as lauan plywood and other plywood, medium-density fiberboard (MDF), particle board, solid wood, and wood fiberboard; inorganic materials such as cement board, gypsum board, and autoclaved lightweight concrete (ALC); and plastic materials such as vinyl chloride resin, polyolefin resin, and polyester resin.

Laminated products, which can be obtained by bonding together these adherents and substrates with the moisture-curable hot-melt adhesive of the present invention, may be used in various applications, specifically, building materials, electronic materials, the automotive field, and other fields.

It is not necessary to use special equipment in the manufacture of laminated products, and they can be manufactured using generally known production lines consisting of a conveyer, coater, pressing machine, heater, and cutting machine. For example, manufacturing can be done as follows. While feeding substrate and adherent through with a conveyer, apply a coat of the moisture-curable hot-melt adhesive of the present invention to the substrate or adherent. Control the temperature when applying the adhesive coat to a predetermined temperature with a heater. Lightly press the adherent onto the substrate with a pressing machine, and bond together adherent and substrate by means of moisture-curable hot-melt adhesive. Afterwards, cool the bonded adherent and substrate, and allow the moisture-curable hot-melt adhesive to harden while conveying it directly with the conveyer. After this, cut the substrate with bonded on adherent to the appropriate size with a cutting machine. Because with the present invention the moisture-curable hot-melt adhesive has high initial adhesive strength and a short tack free time, the cutting process for the laminated product can be done at an early stage, and production efficiency increases.

The primary modes for the present invention are as follows.

1. A moisture-curable hot-melt adhesive that is a moisture-curable hot-melt adhesive containing a urethane prepolymer that has a terminal isocyanate group, contains urethane modified resin, has a residual percentage of isocyanate compound of 5.0% or less, and has a heat resistance softening temperature after moisture curing of 60° C. or higher.

2. The moisture-curable hot-melt adhesive described in 1 above in which urethane modified resin is obtained by the reaction of a resin derivative that has a hydroxyl group with isocyanate compound.

3. The moisture-curable hot-melt adhesive described in 1 or 2 above obtained by blending urethane modified resin, polyol, and isocyanate compound.

4. The moisture-curable hot-melt adhesive described in any of 1-3 above in which the aforementioned urethane prepolymer is obtained by the reaction of polyol and isocyanate compound.

5. The moisture-curable hot-melt adhesive described in any of 1-4 above that additionally comprises thermoplastic resin.

6. A method of manufacture for moisture-curable hot-melt adhesive having (i) a process to obtain urethane modified resin by a reaction of isocyanate compound and resin derivative having a hydroxyl group, and (ii) a process to blend urethane modified resin, polyol, and isocyanate.

7. A method of manufacture for moisture-curable hot-melt adhesive that is the method of manufacture for moisture-curable hot-melt adhesive described in 6 above that includes a process to obtain urethane prepolymer by blending polyol and isocyanate compound in process (ii), has a residual percentage of isocyanate compound of 5.0% or less, and has a heat resistant softening temperature after moisture curing of 60° C. or higher.

8. The moisture-curable hot-melt adhesive described in any of 1-5 above produced by the method of manufacture described in 6 or 7 above.

WORKING EXAMPLES

The present invention is described in concrete terms by the working examples and comparative examples below. However, the present invention is not limited by the working examples below provided they do not deviate from the gist of the invention.

Working Example 1

Manufacture of Urethane Modified Resin 90 parts by weight of resin ester (A'-4; Super Ester A100 (trade name) made by Arakawa Chemical Co.: hydroxyl value 15, average molecular weight 920, softening point 100° C.) were charged to a reaction vessel; after melting the resin ester in a 120° C. oven, moisture was removed by agitating the reaction vessel for 1 hour under reduced pressure while heating in a 120° C. oil bath.

Next, 3.3 parts by weight of 4,4'-diphenylmethane diisocyanate (referred to below as "MDI") (Millionate MT made by Nippon Polyurethane Industry Co.) were charged at 120° C.; agitation was performed for 2 hours at 120° C. under reduced pressure, and urethane modified resin (A-1) was obtained.

Results of measurement of the molecular weight distribution of urethane modified resin (A-1) by gel permeation chromatography analysis (GPC analysis) were that the molecular weight of urethane modified resin (A-1) were confirmed to be approximately twice the molecular weight of (A'-4). In addition, results of infrared spectra analysis (IR analysis) confirmed that absorption at 2300 $cm^{-1}$ from the isocyanate group had for the most part disappeared.

Manufacture of Moisture-Curable Hot-Melt Adhesive 27.5 parts by weight of urethane modified resin (A-1) and 9.2 parts by weight of the (B) thermoplastic resin of ethylene vinyl acetate resin (referred to below as "EVA resin") (Ultrathene 726 (trade name) made by Tosoh Corporation; melt index 700, vinyl acetate content 31%) were charged to a reaction vessel. Next, 41.2 parts by weight of polyol (1) (HS 2H-351A (trade name) made by Hokoku Corporation; hydroxyl value 32, melting point 55° C., crystalline) and 13.7 parts by weight of polyol (2) (HS 2F-306P (trade name) made by Hokoku Corporation; hydroxyl value 37, glass transition point 27° C., amorphous) were charged at 120° C., and moisture was removed by agitating for 1 hour under reduced pressure. Next, 8.4 parts by weight of MDI were charged at 120° C., agitated under reduced pressure for 2 hours, and moisture-curable hot-melt adhesive was obtained.

Working Examples 2-4

Moisture-curable hot-melt adhesives were manufactured with the compositions shown in Table 1. The manufacturing conditions and manufacturing operations were the same as the conditions and operations in Working Example 1. In Working Example 3, three types of polyol were used that were not used in Working Example 1, namely, polyol (3) (Eternacoll 3010 (trade name) made by Ube Industries, Ltd.; hydroxyl value 32, melting point 74° C., amorphous), polyol (4) (HS 2H-359T (trade name) made by Hokoku Corporation; hydroxyl value 32, melting point 110° C., amorphous), and polyol (5) (PEG #100U (trade name) made by Nippon Oils & Fats Co.; hydroxyl value 112, melting point 40° C., amorphous).

Working Example 5

Manufacture of Urethane Modified Resin 90 parts by weight of resin ester (A'-4) and 1.7 parts by weight of cyclohexane dimethanol (referred to below as "CDMH") (made by Eastman Chemical Co.; weight-average molecular weight 144) were charged to a reaction vessel, and after melting resin ester in a 120° C. oven, moisture was removed heating the reaction vessel in a 120° C. oil bath and agitating for 1 hour under reduced pressure. Next, 6.6 parts by weight of MDI were charged at 120° C., agitated for 2 hours under reduced pressure, and urethane modified resin (A-2) was obtained.

Results of measurement of the molecular weight distribution of urethane-modified resin (A-2) by gas permeation chromatography (GPC analysis) confirmed that the molecular weight of urethane-modified resin (A-2) was approximately twice the molecular weight of (A'-4). In addition, results of infrared spectra analysis (IR analysis) confirmed that absorption at 2300 cm$^{-1}$ from the isocyanate group had for the most part disappeared.

Manufacture of Moisture-Curable Hot-Melt Adhesive 27.5 parts by weight of urethane modified resin (A-2) and 9.2 parts by weight of EVA resin were charged into a reaction vessel; next, 55.0 parts by weight of polyol (1) were charged at 120° C., and moisture was removed by agitating for 1 hour under reduced pressure. Next, 8.3 parts by weight of MDI were charged at 120° C., agitated for 2 hours under reduced pressure, and a moisture-curable hot-melt adhesive was obtained.

Working Examples 6-7

90 parts by weight of resin ester (A'-5) (Pine Crystal KE359 (trade name) made by Arakawa Chemical Co.; hydroxyl value 43, weight-average molecular weight 900, softening point 100° C.) were charged into a reaction vessel, and after melting the resin ester in a 120° C. oven, the reaction vessel was immersed in a 120° C. oil bath, and moisture was removed by agitating for 1 hour under reduced pressure. Next, 7.7 parts by weight of MDE were charged at 120° C., agitation was performed for 2 hours under reduced pressure at 120° C., and urethane modified resin (A-3) was obtained.

Results of measurement of the molecular weight distribution of urethane modified resin (A-3) by gas permeation chromatography (GPC analysis) confirmed that urethane modified resin came out having approximately twice the molecular weight of (A'-5). In addition, results of infrared spectra analysis (IR analysis) confirmed that absorption at 2300 cm$^{-1}$ from the isocyanate group had for the most part disappeared.

Manufacture of Moisture-Curable Hot-Melt Adhesive

Using urethane-modified resin (A-3), moisture-curable hot-melt adhesives were prepared with the compositions shown in Table 1. Manufacturing conditions were the same as Working Example 1.

Comparative Examples 1-6

All raw materials except MDI were charged into a reaction vessel with the compositions shown in Table 1, and after melting resin in a 120° C. oven, moisture was removed by agitating the reaction vessel in a 120° C. oil bath for 1 hour under reduced pressure. Next, MDI was charged at 120° C. with the compositions shown in Table 1, agitation was performed for 2 hours under reduced pressure, and moisture-curable hot-melt adhesives were obtained.

Test Method

1. Compatibility of Urethane Modified Resin (Phase Separation of Moisture-Curable Hot-Melt Adhesives)

The phase separation of moisture-curable hot-melt adhesives was investigated.

More specifically, moisture-curable hot-melt adhesives from both the working examples and comparative examples were collected into vessels, placed within a 120° C. oven for 1 hour, and visually examined for the presence of phase separation.

Aside from this, coatings of moisture-curable hot-melt adhesives from the aforementioned working examples and comparative examples were applied to clear polyethylene terephthalate (PET) substrates. These were dried for 1 hour at 20° C., and 100 µm thick films were produced on the PET substrates and visually judged for film uniformity. Films where there was no separation of adhesive and the film was also uniform were assessed as having good compatibility (○), and films where separation was confirmed or the film was not uniform were assessed as having poor compatibility (x).

2. Measurement of Residual Percentage of Isocyanate Compound

Preparation of Working Curve 5 g of diphenylmethane diisocyanate (MDI) were taken into a reaction vessel, 20 ml of dehydrated toluene and 10 ml of dehydrated methanol were added, and the reaction was allowed to proceed at room temperature with agitation for 8 hours or more. Then, after drying for 8 hours in a 100° C. oven, sample resin in a white powdered state was obtained for use in preparing a working curve.

1 mg, 2.5 mg, 5 mg, and 10 mg of sample resin were collected into individual ampoule bottles, 10 ml of tetrahydrofuran (THF) was added via a measuring pipette, and THF solution was prepared. The four prepared solutions were put through a GPC, and a working curve was prepared from the sample resin peaks.

Calculation of the Residual Amount (g) of Isocyanate Compound in Moisture-Curable Hot-Melt Adhesive 5 g of moisture-curable hot-melt adhesive from the working examples and comparative examples were taken into reaction vessels, 20 ml of dehydrated toluene and 10 ml of dehydrated methanol were added, and this was agitated for 8 hours at room temperature. The terminal isocyanate group and unreacted isocyanate compound of the moisture-curable hot-melt adhesive were reacted with methanol. The reaction resin (Z) obtained by this reaction was dried for 8 hours in a 100° C. oven. Also, the amount of reaction resin (Z) was considered to be the amount of moisture-curable hot-melt adhesive of the present invention, and the residual amount of isocyanate compound (g) was calculated. 10 mg of reaction resin was taken into an ampoule bottle, 2 ml of THF was added to the reaction resin (Z) by measuring pipette, and the resin was dissolved and treated as THF solution for use in GPC measurement.

20 µl of THF solution was put though a GPC. The working curve for the sample resin was compared to the peak for the reaction resin (Z), and the amount of methanol and MDI reactant (X) (that is, the amount of unreacted isocyanate compound) contained in the reaction resin (Z) was calculated, and the residual percentage of isocyanate compound was determined.

The Residual Percentage of Isocyanate Compound (%) was Calculated Using Formula (I) Below.

Residual percentage of isocyanate compound (wt-%) = Amount of unreacted isocyanate compound (g) × 100 / Amount of moisture-curable hot-melt adhesive (g) = GPC-calculated amount of methanol and MDI reactant (X) × 100 / Amount of reaction resin (Z) = GPC-calculated amount of methanol and MDI reactant (X) ×   Formula (I)

-continued $$100/((\text{Amount of reaction resin }(Z)\text{ collected into}$$
$$\text{ampoule bottle}/2\times 10^{-3})\times 20\times 10^{-6}) =$$
$$GPC\text{-calculated amount of methanol and}$$
$$MDI\text{ reactant }(X)\times 100\times 2$$
$$10^{-3}/(\text{Amount of reaction resin }(Z)\text{ collected}$$
$$\text{into ampoule bottle}\times 20\times 10^{-6}) =$$
$$GPC\text{-calculated amount of methanol and}$$
$$MDI\text{ reactant }(X)\times 100\times 2\times$$
$$10^3/(\text{Amount of reaction resin }(Z)$$
$$\text{collected into ampoule bottle}\times 20) =$$
$$GPC\text{-calculated amount of methanol and }MDI$$
$$\text{reactant }(X)\times 100\times 100/(\text{Amount of reaction}$$
$$\text{resin }(Z)\text{ collected into ampoule bottle}) =$$
$$GPC\text{-calculated amount of methanol and}$$
$$MDI\text{ reactant }(X)\times 10^4/(\text{Amount of reaction}$$
$$\text{resin }(Z)\text{ collected into ampoule bottle})$$

Below, the amount of reactant (X) and the amount of reaction resin (Z) in units of grams (g) are plugged into the formula above. Because 10 mg of reaction resin (Z) was taken into ampoule bottles in the working examples, the residual percentage of isocyanate compound is calculated by Formula (II) below.

$$\text{Residual percentage of isocyanate compound (\%)} = \quad \text{Formula (II)}$$
$$\text{Amount of }GPC\text{-calculated methanol and }MDI\text{ reactant}$$
$$(X)\times 10^4/10\text{ (mg)}\times 10^{-3} = \text{Amount of }GPC\text{-}$$
$$\text{calculated methanol and }MDI\text{ reactant }(X)\times 10^6$$

3. Heat Resistance after Moisture Cooling

After applying coatings of moisture-curable hot-melt adhesive from the working examples and the comparative examples to particle board at a quantity of 40 g/m$^2$, the lightly adhesive treated sheet was laminated. The sheet-laminated particle board was cured for 5 days in a 20° C., 60% humidity environment. After curing, the sheet was cut with a cutter into shapes 25 mm wide and 150 mm long, and these were treated as test pieces. A 500 g weight was suspended from the ears of the test pieces, and they were left undisturbed for 1 hour in a 50° C., 60% humidity environment. Next, temperature was increased to 60° C. and 70° C. and held at each temperature for 1 hour. At each temperature, irrespective of being under load (500 g weight), cases where there were no changes such as deformation observed were assessed as having good heat resistance (○), and cases where creep occurred or that completely detached with cohesive failure were assessed as having poor heat resistance (x).

4. Tack Free Time

Coatings of moisture-curable hot-melt adhesives from the working examples and comparative examples were applied to PET with a thickness of 100 μm. Paper strips were pressed onto the adhesive applied onto PET that had been placed into a 20° C. environment, and when a paper strip is peeled off, the time at which a paper strip that had initially undergone material failure did not experience material failure was taken as the tack free time. Tack free times of 2 minutes or less were rated (○), and times that exceeded 2 minutes were rated (x).

5. Film Strength Before Curing

Moisture-curable hot-melt adhesive from the working examples and the comparative examples was applied between mold-release film at 120° C. so as to have a thickness of 100 μm, and after 2 minutes at room temperature (20° C.), the film was peeled off, and the film was clipped to a size of 25 mm wide and 150 mm long. The top and bottom 50 mm of the film were designated for handling, and the 50 mm in between was taken to be the measurement location. Using a tensile tester (Instron Model 5585), the strength of the film was measured at 20° C. with a tension speed of 100 mm/minute. Film strength before curing roughly corresponds with initial adhesive strength.

TABLE 1

| Ingredients | Working Example 1 | Working Example 2 | Working Example 3 | Working Example 4 | Working Example 5 | Working Example 6 | Working Example 7 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| (A) Urethane modified resin | | | | | | | | | | | | | |
| (A-1) | 27.5 | 27.5 | 27.0 | 28.0 | | | | | | | | | |
| (A-2) | | | | | 27.5 | | | | | | | | |
| (A-3) | | | | | | 26.2 | 27.6 | | | | | | |
| (A'-4) | | | | | | | | 27.4 | 27.0 | 27.0 | | | |
| (A'-5) | | | | | | | | | | | 24.2 | 25.2 | 26.3 |
| (B) Thermoplastic resin | 9.2 | 9.2 | 9.2 | 9.3 | 9.2 | | 9.3 | 9.2 | 9.2 | 9.2 | | | 8.8 |
| (B-1) | | | | | | | | | | | | | |
| Polyol | | | | | | | | | | | | | |
| Polyol (1) | 41.2 | 55.0 | 21.0 | 55.9 | 55.0 | 45.7 | 55.2 | 41.0 | 40.5 | 54.3 | 42.3 | 43.8 | 39.5 |
| Polyol (2) | 13.7 | | | | | 19.6 | | 13.7 | 13.5 | | 18.2 | 18.8 | 13.2 |
| Polyol (3) | | | 12.0 | | | | | | | | | | |
| Polyol (4) | | | 15.0 | | | | | | | | | | |
| Polyol (5) | | | 6.0 | | | | | | | | | | |

TABLE 1-continued

| Ingredients | Working Example 1 | Working Example 2 | Working Example 3 | Working Example 4 | Working Example 5 | Working Example 6 | Working Example 7 | Comparative Example 1 | Comparative Example 2 | Comparative Example 3 | Comparative Example 4 | Comparative Example 5 | Comparative Example 6 |
|---|---|---|---|---|---|---|---|---|---|---|---|---|---|
| Isocyanate compound MDI | 8.4 | 8.3 | 9.8 | 6.8 | 8.3 | 8.5 | 7.9 | 8.7 | 9.8 | 9.5 | 15.3 | 12.2 | 12.2 |
| Total weight | 100.0 | 100.0 | 100.0 | 100.0 | 100.0 | 100.0 | 100.0 | 100.0 | 100.0 | 100.0 | 100.0 | 100.0 | 100.0 |
| Compatibility | ○ | ○ | ○ | ○ | ○ | ○ | ○ | ○ | ○ | ○ | ○ | ○ | ○ |
| Residual percentage of isocyanate compound (wt-%) | 2.6 | 1.3 | 2.5 | 1.3 | 2.3 | 2.8 | 2.5 | 1.4 | 2.9 | 3.1 | 5.5 | 1.4 | 3.3 |
| 70° C. heat resistance | ○ | ○ | ○ | ○ | ○ | ○ | ○ | x | x | x | ○ | x | x |
| 60° C. heat resistance | ○ | ○ | ○ | ○ | ○ | ○ | ○ | x | x | x | ○ | x | x |
| 50° C. heat resistance | ○ | ○ | ○ | ○ | ○ | ○ | ○ | x | ○ | ○ | ○ | x | ○ |
| Tack free time (s) | 1 m 20 s ○ | 27 s ○ | 1 m 40 s ○ | 40 s ○ | 20 s ○ | 1 m 15 s ○ | 1 m 20 s ○ | 6 s x | 4 m 30 s x | 4 m x | 10 m x | 20 m x | 20 m x |
| Film strength before curing (MPa) | 4.1 | 6.1 | 3.8 | 6.7 | 7.5 | 13.7 | 8.4 | Soft, cannot measure | Soft, cannot measure | Soft, cannot measure | Soft, cannot measure | Soft, cannot measure | Soft, cannot measure |

As shown in Table 1, the moisture-curable hot-melt adhesives of Working Examples 1-7 were obtained by blending (A) urethane modified resin, polyol, and isocyanate compound. Because (A) urethane modified resin does not substantially participate in the reaction of polyol and isocyanate, the desired urethane prepolymer can be obtained directly, and there is no need to blend in excess isocyanate compound. As a result, a moisture-curable hot-melt adhesive is obtained having excellent compatibility and heat resistance, a low residual percentage of isocyanate compound (5.0 wt-% or less), a short tack free time (2 minutes or less), high film strength before curing, and excellent initial adhesive strength.

On the other hand, in comparative examples 1-6, resin ester having a hydroxyl group, polyol, and isocyanate compound were blended without the use of (A) urethane modified resin. Because the hydroxyl group of the resin ester does participate in the reaction of polyol and isocyanate compound, the desired urethane prepolymer could not be obtained. Because of this, moisture-curable hot-melt adhesives were obtained having long tack free times (longer than 2 minutes), and poor initial adhesive strength (film properties could not be measured) and poor heat resistance after moisture curing. The moisture-curable hot-melt adhesive of Comparative Example 4 had the same heat resistance as the working examples, but excess isocyanate compound was blended in to increase heat resistance, and the residual percentage of isocyanate compound (5.5 wt-%) was high and environmentally undesirable.

What is claimed:

1. A moisture-curable hot-melt adhesive comprising:
   a prepolymer that has a terminal isocyanate group, and
   a urethane modified resin,
   wherein the adhesive has a residual percentage of isocyanate compound of 5.0 wt % or less, and has a heat resistance softening temperature after curing of 60° C. or higher.

2. The moisture-curable hot-melt adhesive described in claim 1 above in which the urethane modified resin is obtained by the reaction of a resin derivative that has a hydroxyl group with isocyanate compound.

3. The moisture-curable hot-melt adhesive described in claim 1 above obtained by blending urethane modified resin, polyol, and isocyanate compound.

4. The moisture-curable hot-melt adhesive described in claim 1 above in which the urethane prepolymer is obtained by the reaction of polyol and isocyanate compound.

5. The moisture-curable hot-melt adhesive described in claim 1 above that additionally comprises thermoplastic resin.

6. The moisture-curable hot-melt adhesive described in claim 1 above in which the urethane modified resin is a urethane modified tackifier.

7. The moisture-curable hot-melt adhesive described in claim 1 above in which the urethane modified resin is one or more of a urethane modified gum resin tackifier, a urethane modified wood resin tackifier, and a urethane modified tall oil resin tackifier.

8. The moisture-curable hot-melt adhesive described in claim 1 above in which the urethane modified resin is selected form at least one of a urethane modified gum resin, a urethane modified wood resin, a urethane modified tall oil resin.

9. The moisture-curable hot-melt adhesive described in claim 1 above in which the urethane modified resin is prepared by reaction of an isocyanate compound and at least one of a gum resin derivative having a hydroxyl group, a wood resin derivative having a hydroxyl group, and a tall oil resin derivative having a hydroxyl group.

10. The moisture-curable hot-melt adhesive described in claim 1 above in which the urethane modified resin is prepared by reaction of at least one of gum resin, wood resin, and tall oil resin with a polyhydric alcohol to form an ester and reaction of the ester with an isocyanate compound.

* * * * *